Figure 1:
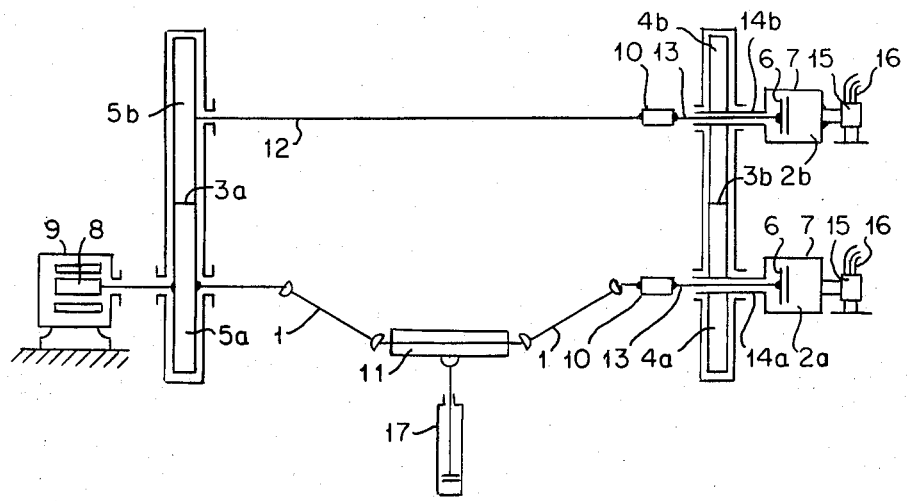

United States Patent [19]
Klinger et al.

[11] 3,796,092
[45] Mar. 12, 1974

[54] TORSION TEST STAND

[75] Inventors: Friedrich Klinger, Darmstadt-Arheilgen; Jan Brezina, Ober-Ramstadt, both of Germany

[73] Assignee: Carl Schenck Maschinenfabrick GmbH, Darmstadt, Germany

[22] Filed: Nov. 26, 1971

[21] Appl. No.: 202,364

[30] Foreign Application Priority Data
Nov. 25, 1970 Germany.......................... 2057872

[52] U.S. Cl. ...................................... 73/99, 73/162
[51] Int. Cl. .............................................. G01n 3/32
[58] Field of Search................................ 73/99, 162

[56] References Cited
UNITED STATES PATENTS
2,981,103  4/1961  Livezey................................. 73/162
3,112,643  12/1963  Lanahan............................. 73/99 X Primary Examiner—Jerry W. Myracle
Attorney, Agent, or Firm—Herbert L. Lerner

[57] ABSTRACT

Torsion test stand for testing power-transmitting structural members such as axles, shafts or similar members, includes a test section including at least two spaced reversing transmissions, each having a pair of meshing gears, means for disposing a plurality of the structural members therebetween, at least one of the structural members being a test specimen to be tested, drive means for applying rotary motion to the reversing transmission and, accordingly to the structural members disposed therebetween, and torque transmission couplings corresponding in number to the number of the reversing transmissions for superimposing a torque on the rotary motion and stressing the test specimen against a gear of one of the reversing transmissions with a total torque by a torsion angle that is a function of the ratio of the elasticity of the test specimen of the test section to the elasticity of all of the plurality of structural members of the test section.

11 Claims, 2 Drawing Figures

TORSION TEST STAND

SPECIFICATION:

The invention concerns a torsion test stand for the testing of structural parts serving for the transmission of power such as axles, shafts and the like, with a torque superimposed upon a rotary motion, in which the structural member being tested (test specimens) or structural members having similar properties are disposed between reversing transmission (test section), and the torque is produced by subjecting two structural parts to torsion relative to each other by means of a tensioning coupling or a torque transmission.

In torsion test stands of this kind, rotating test specimens are to be subjected to test stresses as they actually occur. For this purpose, one or more test specimens and other devices necessary for the test loading and for the measurements are assembled to form a test section which is stressed by loads that are provided in a test program. The test program includes instances of loading which also occur in actual practice. It can, for example, have been recorded in a trial run. By the arrangement of the torsion test stand, all instances of loading that are included in the program are to be transmitted with high fidelity to the test specimen. Therefore, the lowest resonant frequencies of such a testing device should be so high that they will not cause interference at the highest frequencies provided in the testing program.

Testing machines with rotating test sections and with a rotating torque transmission coupling are known. It is also known to connect the two ends of a test section by means of a pre-torque transmission to form a force-locking circuit. The resonant frequencies of this test section are low and, in the known torsion test stands, prevent a realistic execution of the test program, so that oscillations can build up in the test section to high values whereby the test section is stressed with torsional stresses that are not programmed nor desired.

It is an object of the present invention to provide a torsion test stand for program-controlled torsional load experiments, especially on rotating test bodies, in which the execution of a test program is not disturbed by resonant vibrations in the torsion test stand and in which no unforeseen torsional stresses can act on the test specimen.

Torsion test stand for testing power-transmitting structural members such as axles, shafts or similar members, comprising a test section including at least two spaced reversing transmissions, each having a pair of meshing gears, means for disposing a plurality of the structural members therebetween, at least one of the structural members being a test specimen to be tested, drive means for applying rotary motion to the reversing transmissions and, accordingly to the structural members disposed therebetween, and torque transmission couplings corresponding in number to the numbers of the reversing transmissions for superimposing a torque on the rotary motion and stressing the test specimen against a gear by one of the reversing transmissions with a total torque by a torsion angle that is a function of the ratio of the elasticity of the test specimen of the test section to the elasticity of all of the plurality of structural members of the test section.

In accordance with one embodiment of the invention, each of the tensioning couplings includes a housing, and one of the gears of a respective reversing transmission is rigidly connected to a respective housing for rotation therewith.

In accordance with a second embodiment of the invention each of the tensioning couplings includes a housing, and the gears of a given reversing transmission are rigidly connected, respectively, to each of the housings for rotation therewith.

In accordance with another feature of the invention, a respective drive motor is coordinated with each of the reversing transmissions.

In accordance with a further feature of the invention, means for damping torsional oscillations are coordinated with each of the reversing transmissions. Other features of the invention are that the drive motors have torsional oscillation-damping properties and/or a speed control circuit coordinated with each drive motor has dimensions for damping torsional oscillations of the gears. Furthermore, in accordance with the invention, other damping devices may be provided for damping the torsional oscillations.

In accordance with concomitant features of the invention, there are provided devices in the test section for measuring the torsional stresses acting upon the test specimen or the torsion angle or angular displacement of the test section produced thereby.

In accordance with an additional feature of the invention, there is provided a torsion test stand including devices coordinated with the test section for applying additional test stresses to the test specimen, such as for applying translatory or tumbling motion to an end of the test specimen, for example.

In accordance with another feature of the invention, the test section is adapted to include at least two test specimens to be tested simultaneously, and has joints length compensation devices and guide sections connected to one another and connectible to the test speicmens.

Other features which are considered as characteristic for the invention are set forth in the appended claims.

Although the invention is illustrated and described herein as embodied in torsion test stand, it is nevertheless not intended to be limited to the details shown, since various modifications and structural changes may be made therein without departing from the spirit of the invention and within the scope and range of equivalents of the claims.

Figure 2:
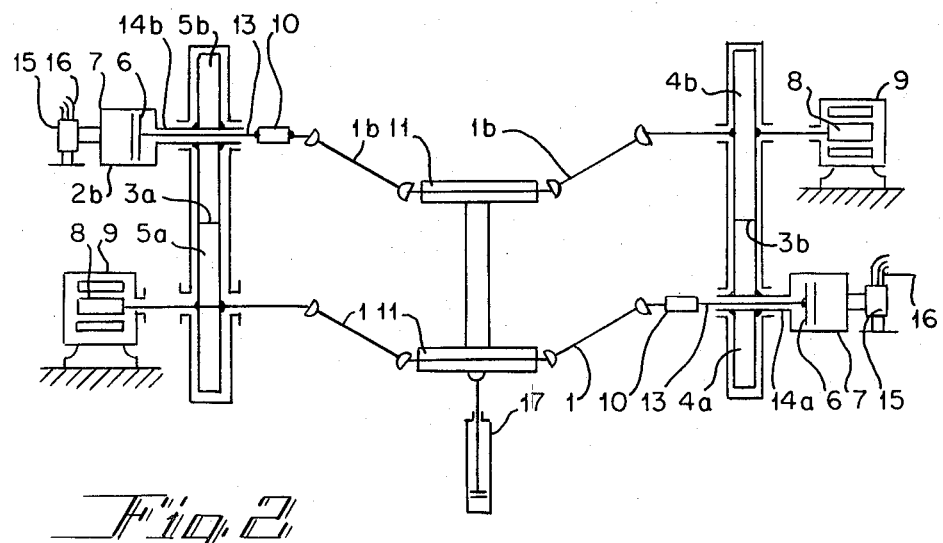

The construction and method of operation of the invention, however, together with additional objects and advantages thereof will be best understood from the following description of specific embodiments when read in connection with the accompanying drawing, in which:

FIG. 1 is a diagrammatic view of a torsion test stand constructed in accordance with the invention having a rotating test section with test specimens and reversing transmission that are located at both ends of the test section, one of the reversing transmissions including torque transmission couplings connected respectively to both gears thereof; and FIG. 2 is a diagrammatic view of another embodiment of the torsion test stand having two test sections, with test specimens and reversing transmissions located at both ends of both test sections.

Referring now to the drawing and first particularly to FIG. 1 thereof, there is shown a test section containing two test specimens 1, such as a universal-joint shaft, for example, which can be deflected laterally by a guide section 11. The test section is connected at one side rigidly with a gear 5a of one reversing transmission 3a and the rotor 8 of a drive motor 9. On the other side, the test section is connected, through a measuring device 10 and a shaft 13, to a rotating piston 6 of a torque transmission coupling 2a which also rotates. The torque transmission coupling 2a has a housing 7 that is connected to a gear 4a of the second reversing transmission 3b by means of a hollow shaft 14a, in which the shaft 13 is rotatably supported. The gear 4a meshes with a like gear 4b of the same reversing transmission 3b which is also connected by means of a hollow shaft 14b to the housing 7 of a second similarly rotating torque transmission coupling 2b. In this torque transmission coupling 2b, the rotating piston 6 is connected to a connecting or transmission shaft 12 which is rotatably supported at its one end in the hollow shaft 14b with a measuring device 10 intervening, if desired. The connecting shaft 12 is rigidly connected at its other end with the gear 5b of the first reversing transmission 3a, which meshes with the other gear 5a of the same transmission and thereby closes the torque transmission circuit. Through the rotation of the rotor 8 of the drive motor 9, all of the rotating parts are turned uniformly. The two torque transmission couplings 2a and 2b also rotate therewith uniformly without having any effect upon the arrangement.

The two torque transmission couplings 2a and 2b have actuating valves that are connected so that they simultaneously produce torques of equal magnitude when subjected to a stress or loading pulse. The two torque transmission couplings 2a and 2b are actuated simultaneously through slip ring connections 15 and lines 16. With such torque transmission couplings, which operate hydraulically, the rotating pistons 6 in the respective torque transmission couplings 2a and 2b, are subjected to the same torque relative to the respective housings, the torque, on the one hand, being transmitted through the two housings 7 and two hollow shafts 14a and 14b to the fixedly rotatable gears 4a and 4b which are in mutual meshing engagement with each other and, on the other hand, through the respective ends of the test section and the transmission shaft 12 that are connected to the respective rotating pistons 6 so that in the torque transmission circuit which consists of the torque transmission coupling 2a, the test specimens 1, the reversing transmission 3a, the transmission shaft 12 and the transmission gears of the reversing transmission 3b, the sum total of the torques generated by the two torque transmission couplings prevails. If, according to the invention, the torsion angle corresponds to the ratio of the elasticity or resilience of the respective test section to the total elasticity or resilience, the two reversing transmissions 3a and 3b are neither accelerated nor decelerated by the torques generated by the torque transmission couplings 2a and 2b. The opposing torsions of the test section and the transmission shaft 12 are greatest at the ends at which the two torque transmission couplings 2a and 2b are connected. The torsions produced drop to zero along their transmission path from the torque transmission couplings 2a and 2b to the reversing transmission 3a. In such a system, the lowest resonant or natural oscillations are at frequencies that are relatively high for torsion test stands.

If alternating torsional stresses or loads are then produced by means of the two torque transmission couplings, the highest frequencies of those alternating stresses being far below the frequency of the lowest resonant or natural oscillation of the torque transmission circuit, the alternating stresses are produced in accordance with the desired values fed to the torque transmission couplings 2a and 2b through the lines 16. There is no danger of any disturbances due to the resonant oscillation of the test system.

In FIG. 1 only the transmission gear 5a is rigidly connected for rotation with the rotor 8 of the drive motor 9. It is particularly advantageous to coordinate a drive motor also with the other reversing transmission 3b. The two drive motors are then connected so that they run synchronously. The drive motors may be in the form of DC shunt-type motors, motors with shunt behavior or hydraulic motors, it being advisable that the rotary speed thereof be maintainable at a constant value by a suitable control circuit.

The characteristic of the rotary speed control should be such that torsional oscillations of the transmission gears produced by disturbance of any kind are damped by the drive motors. It is immaterial whether the damping results from the construction of the drive motors or from appropriate dimensioning of the rotary speed control circuit. Instead of producing the damping through the drive motors or the control circuits thereof, torsional oscillations of the transmission gears that may occur can also be damped by other oscillation-damping structural members.

In principle, it is immaterial whether the actuation of the torque transmission couplings is effected through the lines 16 when the testing system of the torsion test stand is at rest or is rotating. The torques that are produced act as accelerations or decelerations in a state of uniform motion or as acceleration in the one or other direction on the test body and the transmission shaft when the test system does not rotate.

In FIG. 2, the transmission shaft 12 of FIG. 1 is replaced by a second test section including test members 1b having a total torsional elasticity preferably equal to that of the first test section. Both test sections are enclosed force-lockingly in a circuit by reversing transmission 3a and 3b which are secured to the ends thereof. One gear 5a or 4b, respectively, of each reversing transmission 3a and 3b is connected to the rotor 8 of a respective drive motor 9 and, also respectively to one side of a test section, while the other side of the respective test section is rigidly connected to the rotating piston 6 of a respective torque transmission coupling 2a or 2b. The transmission gears 5a and 4b, respectively, mesh with the respective gears 5b and 4a, which are each connected rigidly with a respective housing 7 of one of the torque transmission couplings 2a and 2b. The transmission gears 5b and 4a, respectively, are thus supported rotatably with respect to the shafts 13, respectively, which are twisted by the respective rotating piston 6 and transmit a torque to the respective test section through the measuring devices 10, respectively.

The two drive motors 9 are connected so that they run synchronously. They are preferably DC shunt motors which have the control characteristics required for testing machines. Additional AC or three-phase synchronous motors which, at normal operation, rotate in exact synchronism with the line frequency, can be coordinated on the same shaft, respectively, with the DC shunt motors. Hydraulic drive motors whose speed is kept constant by a control circuit, can also be used.

The two torque transmission couplings 2a and 2b are actuated simultaneously and thereby transmit simultaneously torques of equal magnitude to the two test sections where, however, the torsion angles can be of different magnitude, depending on the torsional elasticity of the test sections.

When no torques are initially produced by the torque transmission couplings 2a and 2b, all parts of the test system rotate at uniform speed, or can be at rest. If torques are produced simultaneously by the two torque transmission couplings 2a and 2b, however, the housing 7 with the gears 4a and 5b, respectively, are simultaneously rotated in a system according to FIG. 2, relative to the respective rotating piston 6 and the shaft 13 by the torque produced, in the first and in the second test section. If the torsion angle of the torque transmission couplings is chosen so that, in accordance with the invention, it corresponds to the ratio of the elasticity of the connected test section to the elasticity of both test sections, the lowest resonant oscillations will also be at high frequencies.

If the vibration or oscillation test figures present in the test program are far below the lowest resonant or natural frequency of the system, the test apparatus according to the invention, can follow any stress program without falsification or adulteration that might otherwise occur, for instance, due to resonance phenomena.

Besides the two torque transmission couplings, additional loading devices can be connected which act upon the test specimens. Such loading devices are represented, for example, in FIGS. 1 and 2 by the guide sections 11 which can be moved by drives 17, such as hydraulic drive, and by which lateral deflection of the mutually coupled test specimens 1 can be effected. If additional length-compensation devices are built into the test section, lateral reciprocatory motions, tumbling motions, and the like, can also be perfomed with these guide sections.

Such forms of motion are carried out, in accordance with the actual operating conditions wherein torques are yet to be transmitted that are produced by the torque transmission couplings 2a and 2b, while the universal-joint shafts rotate simultaneously about their longitudinal axis.

Since the torque produced by the torque transmission couplings is maintained, only so much driving power is consumed in this torsion test stand as is required for maintaining uniform rotary speed and to supply the test load.

With the torsion test stand according to the invention, it is possible to use considerably higher test frequencies than heretofore and to transmit to the test specimens an exact replica of the stresses provided in the test program by the loading devices. With the torsion test stand of the invention of this application, it is furthermore possible to test, at the same time and with the equal stresses, several test specimens connected in tandem.

Instead of the embodiment with two test sections, shown in FIG. 2, even more test sections can be provided in one test stand, each test section being capable of containing several test specimens.

What is claimed is:

1. Torsion test stand for testing power-transmitting structural members such as axles, shafts or similar members, comprising a test section including at least two spaced reversing transmissions, each having a pair of meshing gears, means for disposing a plurality of the structural members therebetween, at least one of the structural members being a test specimen to be tested, drive means for applying rotary motion to said reversing transmissions and, accordingly, to the structural members disposed therebetween, and torque transmission couplings corresponding in number to the number of said reversing transmission and respectively connected thereto for superimposing a torque on the rotary motion and dynamically loading the test specimen against one of said gears of said reversing transmissions.

2. Torsion test stand according to claim 1, wherein each of said torque transmission couplings includes a housing, and one of the gears of a respective reversing transmission is rigidly connected to a respective housing for rotation therewith.

3. Torsion test stand according to claim 1, wherein each of said torque transmission couplings includes a housing, and the gears of a given reversing transmission are rigidly connected, respectively, to each of said housings for rotation therewith.

4. Torsion test stand according to claim 1, wherein said drive means comprise a respective drive motor coordinated with each of said reversing transmissions.

5. Torsion test stand according to claim 4, including a control circuit respectively coordinated with each of said drive motors for maintaining the rotary speed thereof at a constant value.

6. Torsion test stand according to claim 5, wherein said control circuits have dimensions for damping torsional oscillations of the gears.

7. Torsion test stand according to claim 4, wherein said drive motors have torsional oscillation-damping properties.

8. Torsion test stand according to claim 1, including means for damping torsional oscillations coordinated with each of said reversing transmissions.

9. Torsion test stand according to claim 1, including a measuring device in said test section for measuring the applied torque.

10. Torsion test stand according to claim 1, wherein said test section is adapted to receive at least two test specimens to be tested simultaneously, and is respectively provided with joints, respectively connected to said reversing transmissions and connectible to the test specimens and guide sections disposed between said reversing transmissions and adapted to receive the test specimens, respectively, therein.

11. Torsion test stand according to claim 1, including loading devices connected to said torque transmission coupling for applying additional test stresses to the test specimen.

* * * * *